(12) United States Patent
Drechsel (10) Patent No.: US 12,464,991 B2
(45) Date of Patent: Nov. 11, 2025

(54) SYSTEM FOR REGULATING THE FLOW RATE OF A LIQUID AND CORRESPONDING REGULATION METHOD

(71) Applicant: Arno Drechsel, Lienz (AT)

(72) Inventor: Arno Drechsel, Lienz (AT)

(73) Assignee: Komet Austria GmbH, Lienz (AT)

( * ) Notice: Subject to any disclaimer, the term of this patent is extended or adjusted under 35 U.S.C. 154(b) by 0 days.

(21) Appl. No.: 17/629,700

(22) PCT Filed: Dec. 23, 2021

(86) PCT No.: PCT/IB2021/062240
§ 371 (c)(1),
(2) Date: Jan. 24, 2022

(87) PCT Pub. No.: WO2022/137193
PCT Pub. Date: Jun. 30, 2022

(65) Prior Publication Data
US 2023/0309471 A1    Oct. 5, 2023

(30) Foreign Application Priority Data
Dec. 23, 2020  (IT) .......................... 102020000032216

(51) Int. Cl.
*A01G 25/16* (2006.01)
*B05B 12/08* (2006.01)
*A01G 25/09* (2006.01)

(52) U.S. Cl.
CPC ............ *A01G 25/16* (2013.01); *B05B 12/085* (2013.01); *A01G 25/092* (2013.01)

(58) Field of Classification Search
CPC ... A01G 25/16; B05B 12/085; F16K 37/0041; F16K 37/0083; F16K 7/045
See application file for complete search history.

(56) References Cited

U.S. PATENT DOCUMENTS

| | | | | |
|---|---|---|---|---|
| 5,059,879 | A * | 10/1991 | Watanabe | G05B 19/23 318/434 |
| 2011/0248104 | A1* | 10/2011 | Malsam | A01G 25/092 239/723 |
| 2016/0161004 | A1* | 6/2016 | Thompson | F16K 1/02 251/8 |
| 2018/0245698 | A1* | 8/2018 | Musolf | G05D 16/2022 |

\* cited by examiner

*Primary Examiner* — Reinaldo Sanchez-Medina
*Assistant Examiner* — Nicole Gardner
(74) *Attorney, Agent, or Firm* — Themis Law (57) ABSTRACT

A system for intelligent regulation of the flow rate in an irrigation plant includes a pipeline feeding an irrigation liquid, a drop pipe connected to the pipeline, and a regulation device connected to the drop pipe and associated with a liquid distribution device having a continuous regulating valve and a local electronic control unit that varies pressure and flow rate of the liquid sent to a nozzle. The continuous regulating valve includes an elastically yielding pipe connected to the drop pipe and a valve member interacting with the pipe to deform it and vary its flow area. A program installed in the electronic control unit controls the movement of the valve member and changes flow rate downstream of the drop pipe, avoiding sudden variations and water hammers. The local electronic control unit is associated with a sensor that detects abnormal operation of the regulation device, enabling preventive maintenance.

10 Claims, 6 Drawing Sheets

SYSTEM FOR REGULATING THE FLOW RATE OF A LIQUID AND CORRESPONDING REGULATION METHOD

TECHNICAL FIELD

The present invention generally finds application in the field of irrigation systems and particularly relates to a system for regulating the flow rate of a liquid in an irrigation plant.

The invention also relates to a method of regulating the flow rate of an irrigation liquid in an irrigation plant using the aforementioned regulation system.

STATE OF THE ART

In the field of irrigation systems a center pivot or linear system is known comprising a truss mounted to motorized wheels moving along an area of ground to be irrigated.

The truss has a pipeline for feeding an irrigation liquid mounted thereto, and connected to a plurality of drop pipes coupled to respective sprinklers with nozzles adapted to distribute the liquid over the ground.

Typically, each sprinkler comprises a fitting connected to its respective drop pipe and a distributing nozzle for delivery of a downward liquid jet.

The present invention relates to Variable Rate Irrigation (VRI) systems, which are designed to accurately meter the liquid, thereby avoiding irrigation liquid waste.

Some systems of this type are designed to control the delivery to ground sectors by controlling the speed of the rotational or translational movement of the support structure, with water flow rate being constant, and hence do not require particular valves upstream of the nozzles.

Other systems are based on the control of valve assemblies and afford more flexible and accurate liquid distribution but have the drawback of not allowing delimitation of the contours of the area to be irrigated, resulting in areas with inadequate irrigation next to areas with excess irrigation.

In an attempt to at least partially obviate this drawback, liquid flow regulation devices have been developed that are designed to be individually associated with each distribution nozzle.

Typically, this regulation is carried out using solenoid valves installed upstream of the distribution nozzle and time-controlled to regulate the amount of liquid required by the soil to be irrigated based on the opening/closing times of the solenoid valve.

Here, the solenoid valves, in this case, are of the open/close type, and are controlled by appropriate solenoids. Moreover, the flow rate of the irrigation liquid can be only ascertained by having a pressure regulator associated with each valve and installed between the solenoid valve and the nozzle.

Since the valve supply line is always under pressure, valves are always opened and closed with abrupt movements, with water hammers exerting high stress on the components downstream of the solenoid valves, such as pressure regulators, drop pipes and nozzles. This stress dramatically reduces the service life of these components and of the valves, thereby forcing the users to very frequent replacements.

US2011248104 discloses an irrigation system as described above, having a plurality of sprinklers controlled by respective regulation devices with variable-area valves to continuously vary the flow rate of each sprinkler.

The system comprises a central control unit for controlling and monitoring the geographic location, the speed and the direction of movement of the supply line using one or more GPS position sensors, as well as the pressure of the liquid that flows into the system.

Namely, each regulation device comprises a valve whose inner area can be varied by mechanical needle-operated control means and an electronic control unit for adjusting the position of the control means and setting the flow rate of each individual sprinkler.

A first drawback of this known solution is that liquid flow regulation in each nozzle is inaccurate because it only accounts for the pressure of the liquid along the supply line, and not the pressure of liquid downstream of the regulation device.

A further drawback is that the control means have an essentially mechanical operation, which exposed them to wear and thus to malfunctioning.

In order to at least partially obviate these drawbacks, regulation devices have been developed which are directly connected to the sprinkler and are equipped with a sensor for detecting the pressure of the liquid downstream of the regulation device.

U.S. Pat. No. 6,892,900, by the Applicant hereof, discloses a sprinkler that comprises a regulator with a valve body having a flexible duct and a valve member for varying the area of the duct, and a pressure sensor for measuring the pressure of the liquid downstream of the regulator and sending a feedback signal to a control unit that controls the movement of the valve member to regulate the flow through the valve.

A system irrigation map is installed in a central control unit and indicates the pressure required for each sprinkler as the system moves, and hence the requested water flow rate based on its position on the ground to be irrigated.

While this type of sprinkler affords improved accuracy in distributing the irrigation liquid, it still cannot control the movement of the valve member to avoid sudden flow variations and consequent water hammers, and cannot indicate abnormal operation or malfunctioning of the system.

Technical Problem

In light of the prior art, the technical problem addressed by the present invention is to afford intelligent liquid flow regulation in each nozzle of an irrigation plant, while affording indication of abnormal operation and malfunctioning for preventive maintenance.

DISCLOSURE OF THE INVENTION

The object of the present invention is to obviate the above drawback, by providing a system for intelligent regulation of a liquid flow rate in an irrigation plant and a regulation method that are highly efficient and cost effective.

A particular object of the present invention is to provide a system for intelligent liquid flow regulation and a regulation method as described above that avoid sudden flow variations and water hammers.

Another object of the present invention is to provide a system for intelligent regulation of a liquid flow rate and a regulation method as described above which afford indication of abnormal operation or malfunctioning of each regulation device for preventive maintenance.

A further object of the present invention is to provide a system for intelligent regulation of the flow rate of a liquid that has considerable wear resistance and excellent durability.

A further object of the present invention is to provide a system and a method for intelligent regulation of the flow rate of a liquid that allow a sprinkler to perform a highly accurate regulation of the liquid that is strictly required to be sent to the nozzles.

These and other objects, as more clearly explained hereinafter, are fulfilled by a system for intelligent regulation of the flow rate of a liquid in an irrigation plant, as defined in claim 1, wherein the system comprises at least one pipeline for feeding an irrigation liquid, at least one drop pipe connected to the pipeline and at least one regulation device connected to a respective drop pipe and associated with a distribution device having a nozzle.

Each regulation device comprises a continuous regulating valve and a local electronic control unit for varying the pressure and flow rate of the liquid that is sent to the nozzle. Furthermore, the continuous regulating valve comprises a pipe section made of an elastically yielding material connected to the drop pipe and a valve member adapted to transversely interact with the pipe section to deform it and vary its flow area.

Due to the elastic deformation of the pipe section, the flow area is reduced without projections that might cause buildup of solid residues and grass, or else, contained in the liquid.

According to the invention, a program is installed in the electronic control unit to control the movement of the valve member and change the flow rate downstream of each drop pipe, thereby avoiding sudden variations and water hammers.

The local electronic control unit is associated with sensor means configured to detect abnormal operation and malfunctioning of the at least one regulation device and to perform preventive maintenance.

In one embodiment, the valve member is operably coupled to an electric motor via a reduction gear and a screw-and-nut assembly to move between a fully open position in which the flow area of the pipe section does not change, and a closed position in which it completely presses the pipe section and blocks liquid flow.

Conveniently, the sensor means comprise an encoder associated with the electric motor to detect its position and direction of rotation, and electrical measurement means to detect the current absorption required by the motor to ensure a smooth stroke of the valve member, with a substantially constant speed.

This combination of characteristics affords very smooth opening and closing of the valve, thereby systematically avoiding water hammers, and minimizing the mechanical stress on the regulator and on the components downstream thereof.

The sensor means are also configured to generate electric signals adapted to detect abnormal operation and malfunctioning of each regulation device.

The invention also relates to a method of regulating the flow rate of an irrigation liquid in an irrigation plant as described hereinafter.

Advantageous embodiments of the invention are obtained in accordance with the dependent claims.

BRIEF DESCRIPTION OF THE DRAWINGS

Further features and advantages of the invention will be more apparent from the detailed description of a preferred, non-exclusive embodiment of a system for intelligent regulation of the flow rate of a liquid in an irrigation plant as described above, which is described as a non-limiting example with the help of the annexed drawings, in which:

FIGS. 9A to 11C are a sectional side view, a sectional top view, a partially enlarged side view of the regulation device of FIG. 6 in three different operating steps;

DETAILED DESCRIPTION OF A PREFERRED EXEMPLARY EMBODIMENT

Particularly referring to the figures, there is shown a system, generally designated by numeral 1, for intelligent regulation of the flow rate of a fluid in an irrigation plant for distributing a liquid F, generally water, on a ground G to be irrigated.

Figure 1:
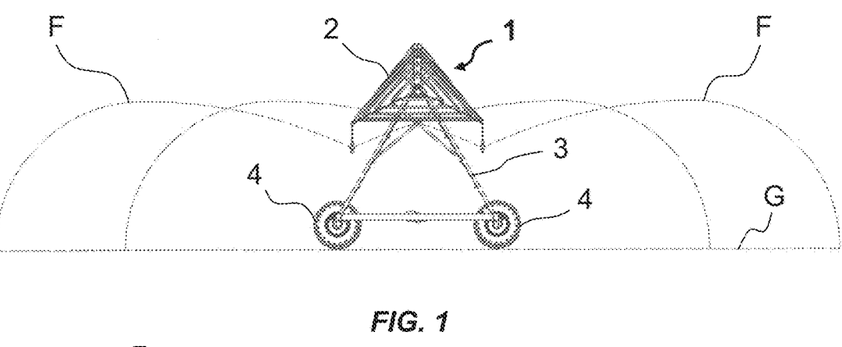
FIG. 1 is a side view of an irrigation plant having a system for intelligent regulation of the flow rate of a liquid according to the present invention.

As shown in FIG. 1, the irrigation system 1, which may be of center pivot or linear move type, comprises a support structure 2 typically formed by a truss with vertical or inclined supports 3 having wheels 4 to move on the ground G.

The system 1 comprises at least one pipeline 5 for feeding the irrigation liquid F, essentially formed by a duct fixed to the support structure 2 and at least one drop pipe 6 in fluid communication with the duct.

Figures 2, 3A, 3B:
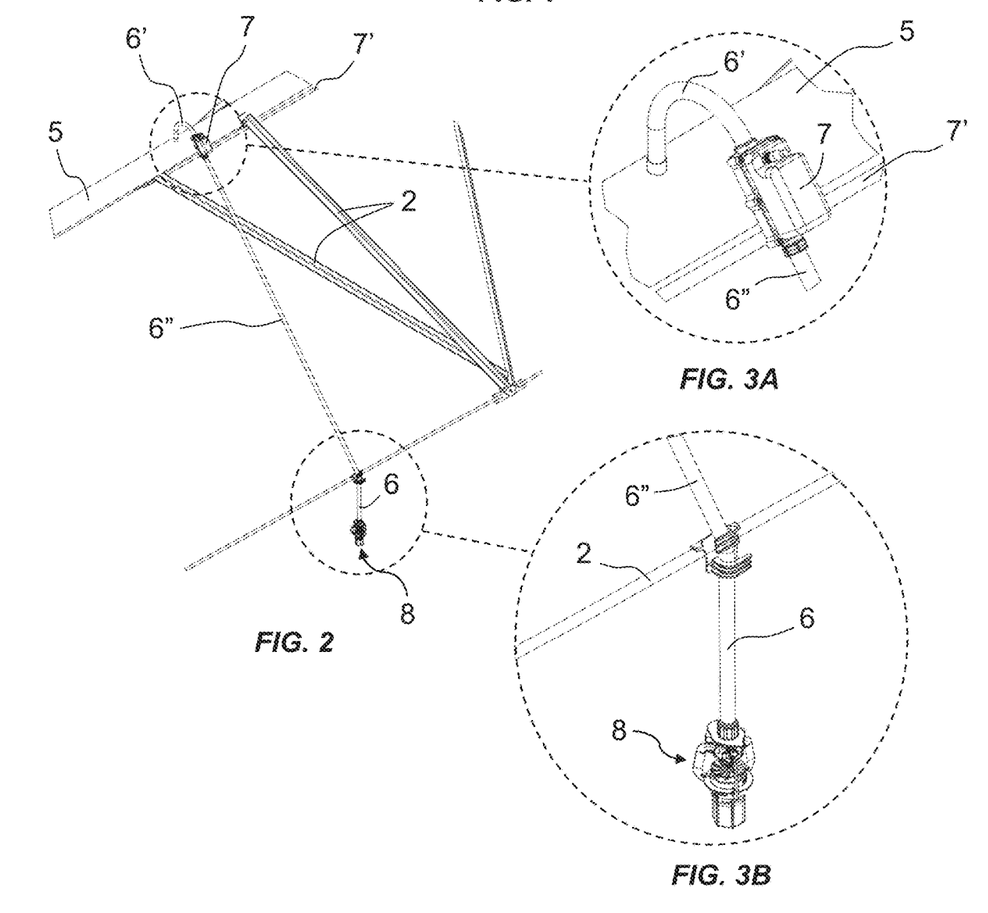
FIG. 2 is an enlarged perspective view of the system of FIG. 1, showing a regulation device coupled to a respective drop pipe and associated with a distribution nozzle.
FIGS. 3A and 3B are enlarged perspective views of the regulation device and of the distribution nozzle of FIG. 2, respectively.

Each drop pipe 6 is associated with a respective regulation device 7 connected to the pipeline 5 via a first pipe section 6' and to the distribution device 8 via a second pipe portion 6", as best shown in FIGS. 2 to 3B.

The regulation device 7 is conveniently connected to an electric cable 7' which provides both electric current and connection with a central control unit, not shown.

In one embodiment, the regulation device 7 is advantageously spaced apart from the distribution device 8 and is connected thereto in fluid communication via an intermediate pipe section 6''', to facilitate installation and avoid the presence of electric cables proximate to the distribution device 8 and the water jets.

This does not exclude that the distribution device 8 may be directly connected downstream of the regulation device 7.

In a well known manner, the distribution device 8 is a typical rotating sprinkler 9 with an inlet fitting 9', a nozzle 10 and a baffle plate 11 facing the nozzle 10 to divert and radially deliver the irrigation liquid F, as described for example in WO201306489, by the Applicant hereof.

Here, the nozzle 10 has a predetermined diameter D and may be of removable type for replacement with another nozzle of different diameter, to vary the maximum flow rate of the liquid jet F or to replace a damaged or defective nozzle.

Nevertheless, the sprinkler 9 may also have a structure other that of the figures, as long as the optionally removable nozzle 10 is provided.

In this VRI irrigation system, each regulation device 7 is equipped with a continuous regulating valve, generally referenced 12, associated with a local control unit 13 for varying the pressure and the flow rate of the liquid sent to the nozzle 10.

Figures 4, 5:
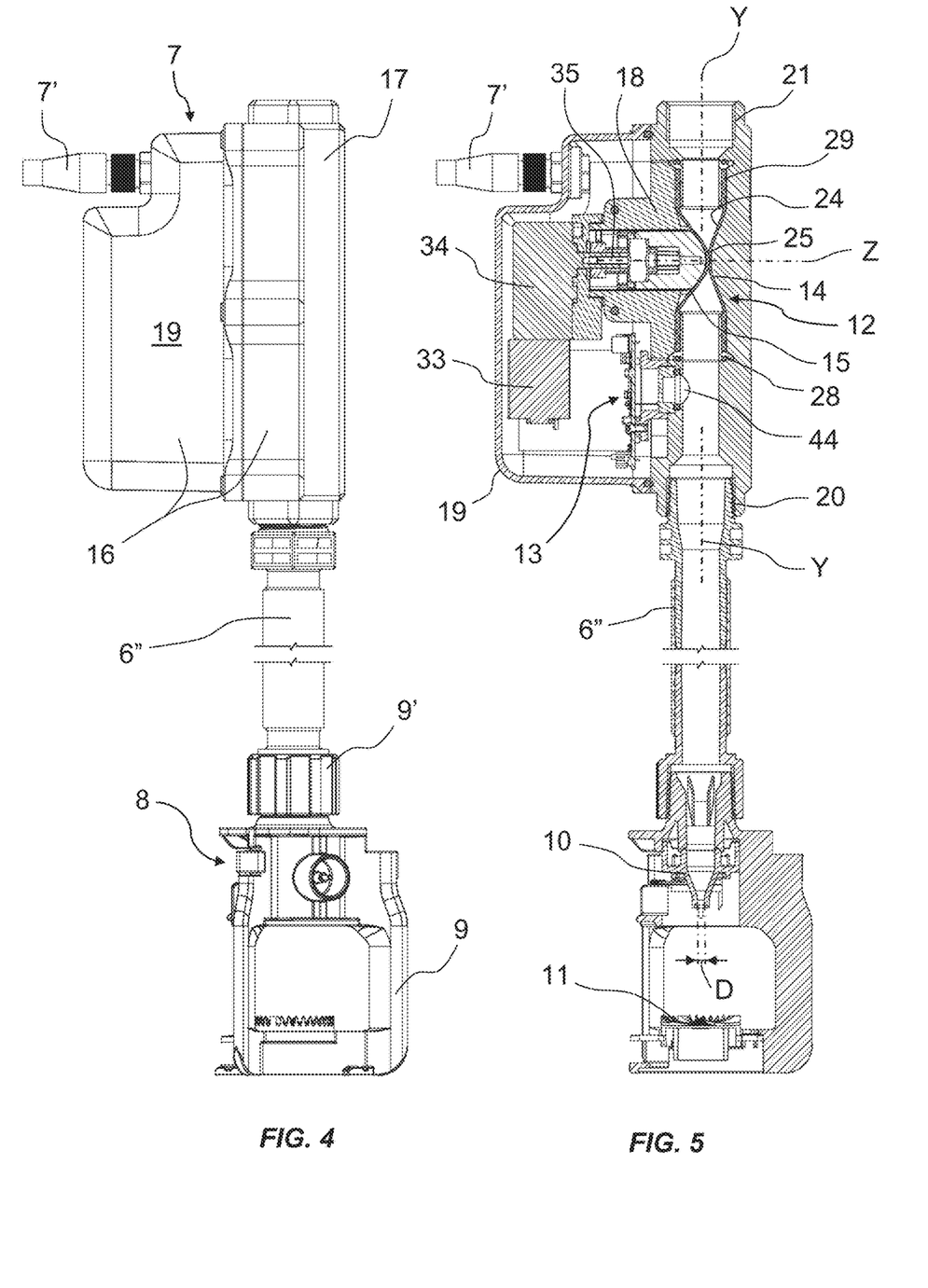
FIGS. 4 and 5 are a side view and a sectional side view of the regulation device and of the distribution nozzle of FIG. 3, respectively.
Figures 6, 7, 8:
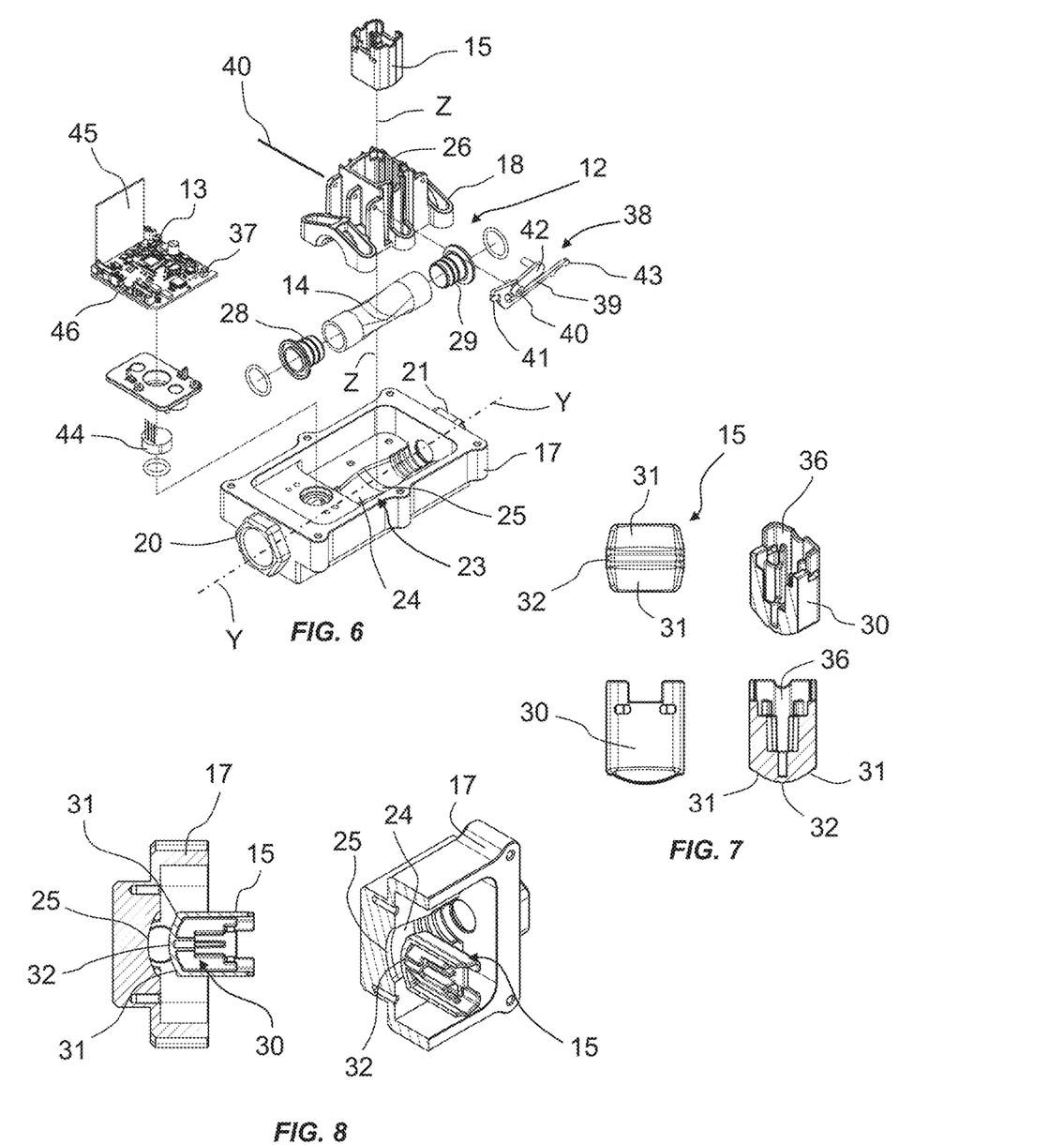
FIG. 6 is an exploded perspective view of a first detail of the regulation device of FIG. 3A.
FIG. 7 shows a front view, a side view and a sectional view of a second detail of the regulation device of FIG. 6.
FIG. 8 is a top view and a sectional perspective view of a third detail of the regulation device of FIG. 6.
Figure 12:
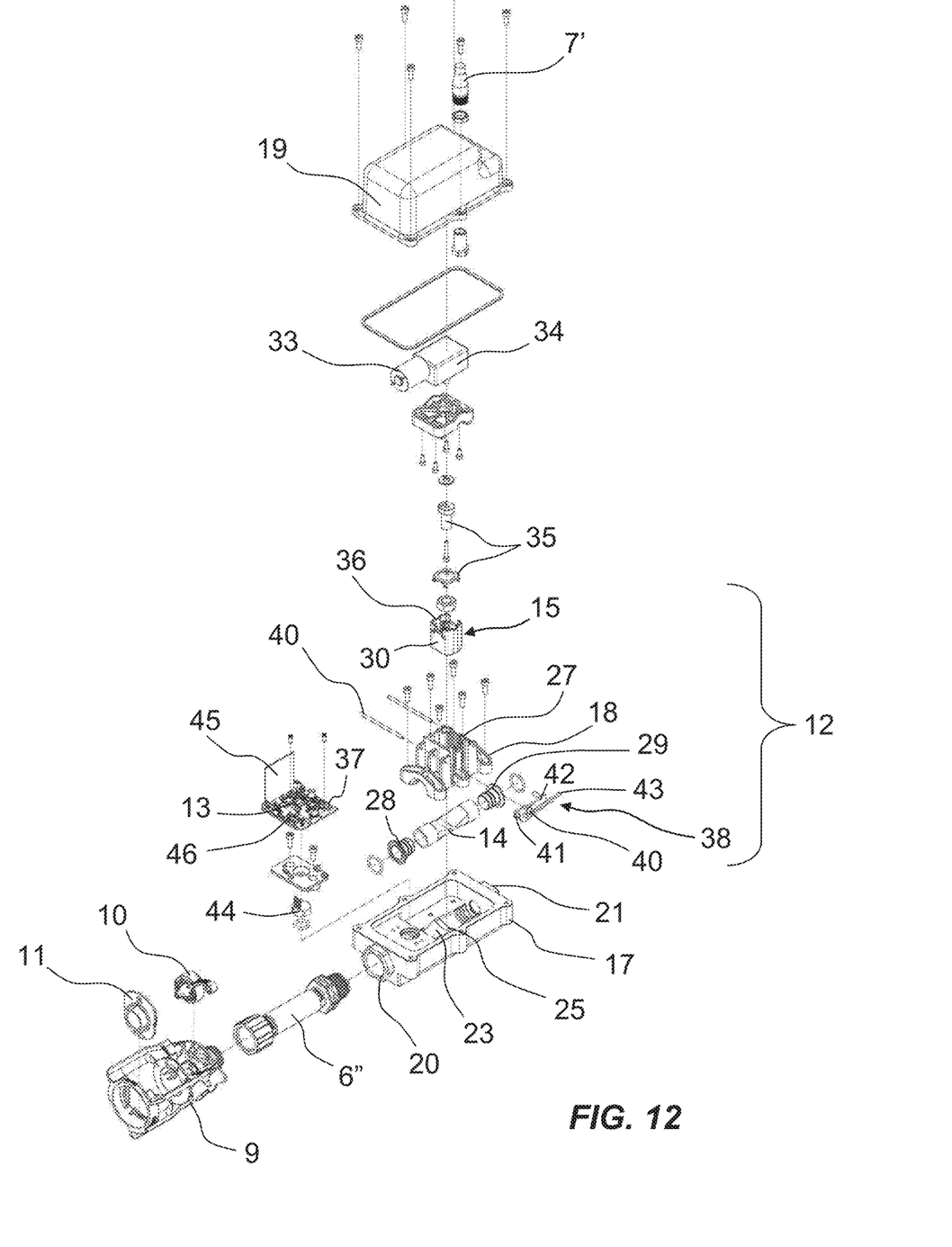
FIG. 12 is an exploded perspective view of the system of FIG. 4.

As best shown in FIGS. 5, 6 and 12, the continuous regulating valve 12 is essentially composed of a pipe section 14 made of an elastically yielding and deformable material, connected to the drop pipe 6 and a valve member 15 adapted to transversely interact with the pipe section 14 to locally squeeze and deform with the purpose of changing its flow area S and hence the flow rate of the outflowing liquid.

More in detail, the valve 12 is arranged inside a box-like body 16 which is composed of a main shell 17 and a secondary shell 18, facing each other with a passage extending along a longitudinal axis Y therebetween. The box-like body 16 has a cover 19 fixed with screws with the interposition of a suitable seal.

The main shell 17 has two end portions 20, 21 with internally threaded holes for receiving respective connecting nipples of the sprinkler 9 or of the drop pipe 6, and an open intermediate portion 22 in which a longitudinal seat 23 with a curved bottom 24 is formed.

According to the invention, the longitudinal seat 23 is suitably shaped to accurately and freely accommodate and support the pipe section 14 when it is entirely deformed and pressed against the bottom 24, namely against its central portion 25. This will effectively and entirely restrict the flow area S of the pipe section 14.

More particularly, the secondary shell 18 comprises a prismatic base from which a hollow member 26 extends, with a transverse seat 27 extending along an axis Z defined therein, opposite to the longitudinal seat 23 of the main shell 17 to slidingly guide the valve member 15 toward and away from the pipe section 14.

The two shells 17, 18 of the main body 16 can be coupled to each other, for example by common snap or screw coupling means, to stably hold the pipe section 14 at two end bushes 28, 29 mounted with respective O-rings at the ends of the pipe section 14.

As best shown in FIGS. 6-8, the valve member 15 slidingly fits into the transverse seat 27 and has a head 30 intended to interact with the pipe section 14.

The surface of the head 30 is suitably shaped with convexity in both longitudinal and transverse directions.

In one embodiment, as shown in FIGS. 7 and 8, the surface of the head 30 has a transverse profile approximately complementary to the cross section of the central portion 25 of the longitudinal seat 23 and an approximately trapezoidal longitudinal profile with two inclined sections 31 connected with wide radii of curvature to a central region 32, the latter having a shape mating the central portion 25 of the seat 23.

The overall shape of the head 30 of the valve member 15 is configured to compress and gradually squeeze the pipe section 14 against the bottom 24 of the longitudinal seat 23.

The connected, corner-free configuration of the head 30 of the valve member 15 avoids projections and abrupt section variations inside the pipe section 14, thereby reducing the risk of clogging and buildup of dirt, grass, soil and other foreign bodies inevitably contained in the irrigation liquid F.

Optionally, if a liquid is very dirty, the interior of the pipe 14 may be accessed after moving the valve member 15 to the fully open position and the pipe section 14 to an expanded configuration, thereby facilitating the automatic unblocking of the pipe section 14. This automatic operation for automatically opening the pipe section 14 is carried out by an appropriate intelligent task integrated in the operating program of the local electronic control unit 13.

The valve member 15 is operably coupled to an electric motor 33, preferably of the BLDC type, via a reduction gear 34 and a screw-and-nut assembly 35 located close to the tail 36 of the valve member 15.

With this kinematic chain, the valve member 15 is moved between a fully open position, in which the valve member 15 does not change the flow area S of the pipe section 14, and a fully closed position in which the valve member 15 interacts with the pipe section 14 and presses it against the bottom 24 of the seat 23 to block the liquid flow.

According to one aspect of the invention, a program is installed in the electronic control unit 13 to control the movement of the valve member 15 and change the flow rate downstream of each drop pipe 6, thereby avoiding sudden variations and water hammers, which are highly detrimental for the components of the system.

Furthermore, the local electronic control unit 13 is associated with sensor means configured to detect abnormal operation and malfunctioning of the regulation device 7 for preventive maintenance thereof.

Advantageously, the local electronic control unit 13, the program and the sensor means are configured to maintain a low and substantially constant speed of movement of the valve member 15, excepting, of course, for the start and stop transients of the electric motor 33.

A very slow movement of the valve member 15 at a substantially constant speed has been experimentally found to improve delivery accuracy and to avoid sudden flow variations and water hammers, which are undesired for the components of the system.

The sensor means comprise an encoder and electrical measurement means, not shown, for controlling the direction of rotation of the motor 33 and detecting the current absorption required by the motor 33 to move the valve member 15, respectively. The sensor means are also configured to send corresponding electrical signals to the local control unit 13 and to detect abnormal operation and malfunctioning of the regulation device 7.

Furthermore, the sensor means comprise a position sensor 37 associated with the valve member 15 to detect the fully open position of the pipe section 14 and to actuate the electrical measurement means as the valve member 15 moves, as further described below.

Figure 11A:
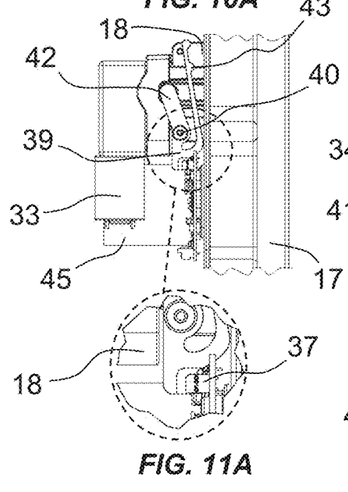
Figure 11B:
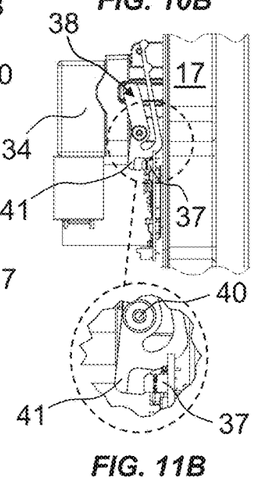
Figure 11C:
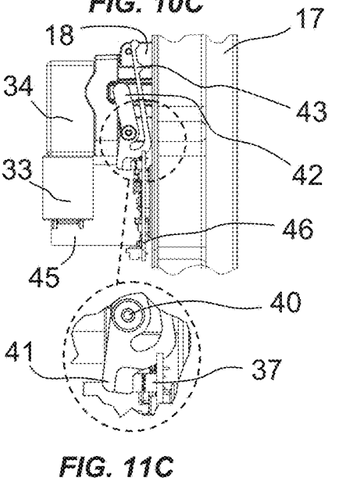

As best shown in FIGS. 6 and 11, a kinematic mechanism 38 is operably associated with the valve member 15 and is adapted to interact with the position sensor 37 in an initial part of the stroke of the valve member 15.

In the embodiment of the figures, the kinematic mechanism 38 comprises a lever 39 pivoted on the secondary shell 18 via a pin 40 and having a first end 41 interacting with the position sensor 37, for example an optical sensor.

The lever 39 has a second end 42 adapted to interact with the valve member 15 and an elastic appendage 43 with an end portion adapted to interact with the secondary shell 18 to keep the first end 41 normally away from the position sensor 37.

Figure 9A:
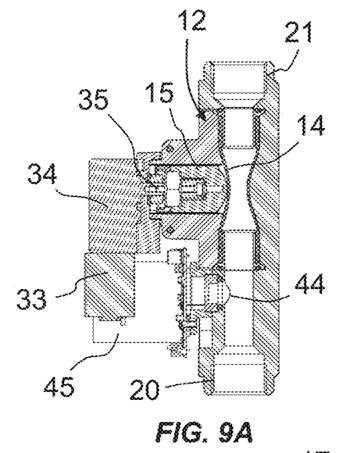
Figure 9B:
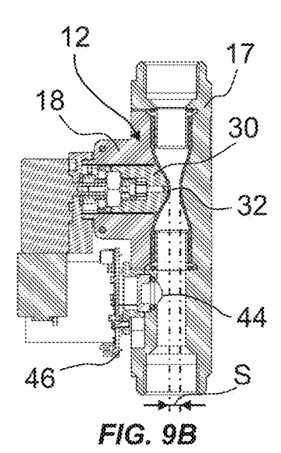
Figure 9C:
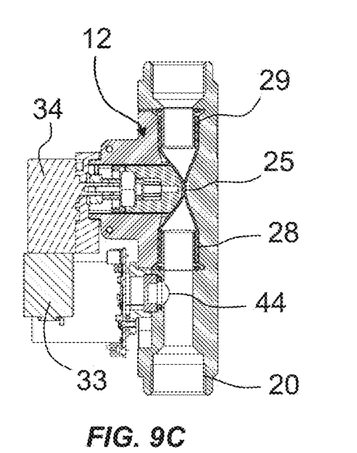
Figure 10A:
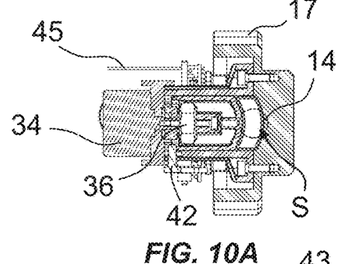
Figure 10B:
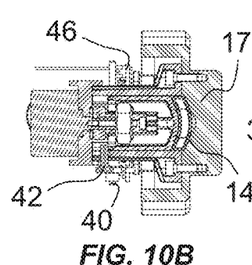
Figure 10C:
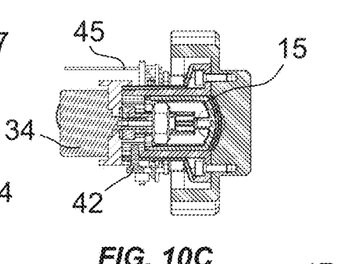
Figure 13:
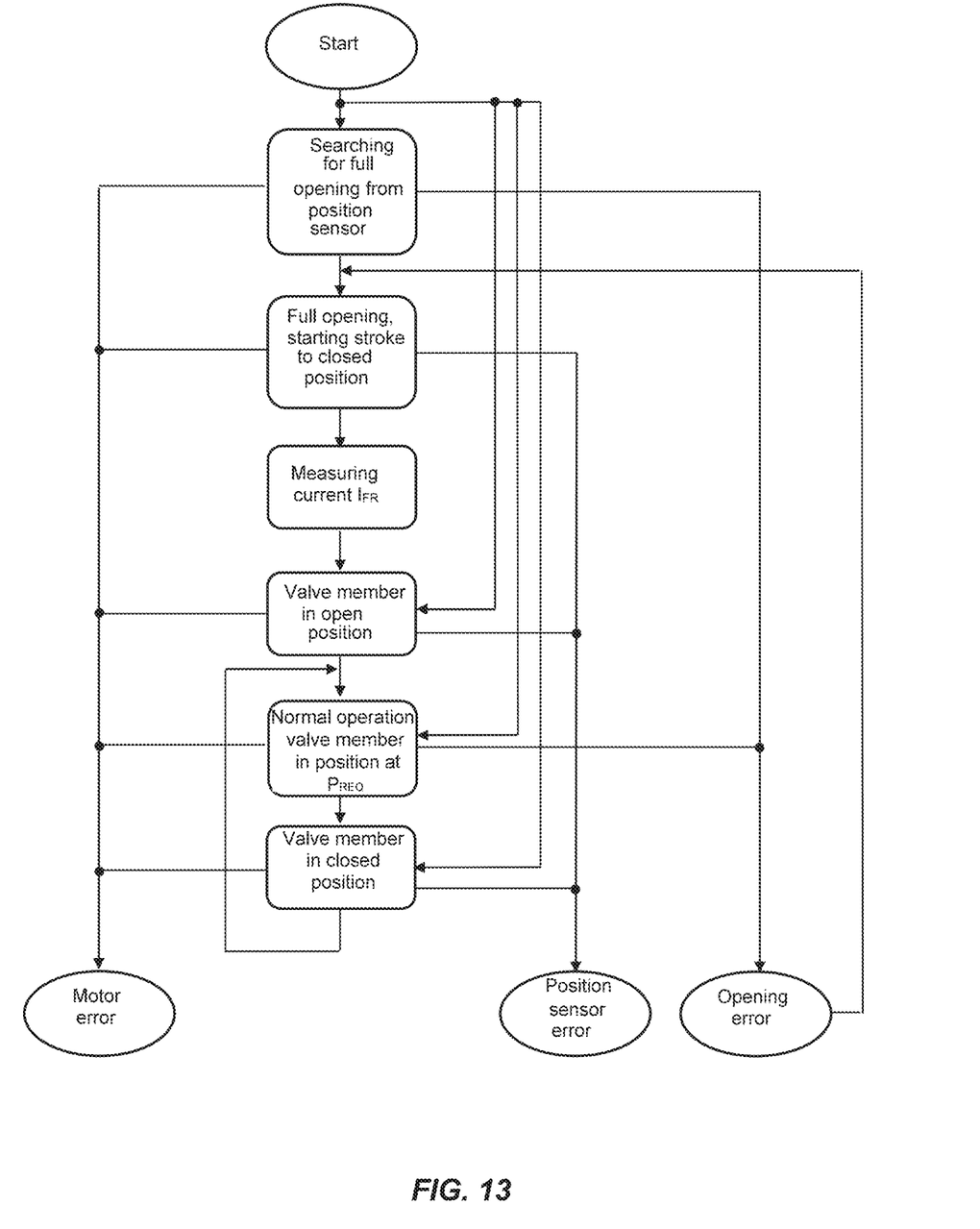
FIG. 13 is a block diagram of a part of the operating program of the regulation device of the present invention.

The program installed in the local electronic control unit 13 comprises an initial calibration routine automatically actuated each time the regulation device 7 is switched on, as shown in the block diagram of FIG. 13, and during operation, as shown in FIGS. 9, 10, 11.

The calibration routine operably controls the valve member 15 to initially move it to the fully open position and then cause it to run a short stroke toward the closed position, during which the measurement means measure the supply current for the motor 33, referenced $I_{FR}$, required to run such a short stroke.

The measurement stroke of the current $I_{FR}$ of the valve member 15 is determined by a predetermined rotation of the encoder, for example by 1000 steps, corresponding to a few tenths of an axial stroke of the valve member 15.

In other words, each time the system 1 is switched on, the local electronic control unit 13 starts the initial calibration routine and, by means of the encoder, moves the electric motor 33 during opening until the optical position sensor 37 is actuated, which defines the fully open position thereof, as shown in FIGS. 9A, 10A and 11A.

Then, the motor 33 is actuated in a reverse direction of rotation to move the valve member 15 during closing through a measuring stroke in which the supply current $I_{FR}$ for the motor 33 as required for such stroke, is measured.

The program installed in the local control unit 13 has a preset maximum current value $I_{FR}$, beyond which an alarm message is sent, to move the valve member 15 toward the closed position of the pipe section 14, a closing current value $I_{FR}$ being added thereto to ensure that the fully closed position is attained and, therefore, to allow the regulation device 7 to operate in the normal pressure-regulating operation, as shown in FIGS. 9B, 10B and 11B.

Therefore, when the motor 33 is moved by means of a total current value equal to the sum of the closing current IoM and the measured current $I_{FR}$, the control unit 13 will be informed that the valve member 15 is in the fully closed position, as shown in FIGS. 9C, 10C and 11C.

Conveniently, the sensor means also comprise a pressure sensor 44 operably associated with each local control unit 13 and adapted to detect the pressure $P_{IST}$ of the liquid F immediately upstream of each nozzle 10. In the embodiment as shown in FIGS. 5, 6 and 9, the pressure sensor 44 is located between the pipe section 14 and the nozzle 10.

Thus, when the system 1 is in operation, but no liquid is present in the pipeline 5, the pressure sensor 44 measures the value of the atmospheric pressure Po, which can be used to set the zero value of the system. If liquid is present in the drop pipe 6, the pressure sensor 44 measures the value of pressure $P_{IST}$ actually present at the nozzle 10.

The program installed in the electronic control unit 13 may be configured to detect the pressure measured by the pressure sensor 44 at each start-up of the system 1, and set it as an initial reference to calibrate the regulation device 7 in consideration of the operating height of the system 1 and the current atmospheric conditions for improved regulation accuracy.

The local electronic control unit 13 may be associated with a memory unit, not shown, which is intended to store the required pressure values $P_{REQ}$. The latter correspond to the diameter D of each nozzle 10 and to the position of the regulator on the system 1, as determined by a user based on an irrigation recipe installed in a central control unit of the system 1.

The local electronic control unit 13 is configured to read the values of the required pressure $P_{REQ}$ from the memory unit and control the movement of the valve member 15 to a substantially constant speed until the measured pressure value $P_{IST}$ from the pressure sensor 44 matches the value of required pressure $P_{REQ}$, unless a minimum predetermined error.

Preferably, the initial calibration routine for positioning the valve member 15 as described above is carried out both at startup of the system 1, and in the event that, upon reaching the completely closed position, the pressure sensor 44 detects a pressure value other than zero.

It will be understood that the particular configuration of the system 1 allows a user to store in each regulation device 7 the value of the diameter D of the respective nozzle 10 and its position along the pipeline 5, to connect each local electronic control unit 13 to a central control unit of the system 1 to continuously vary the values of the pressures $P_{IST}$ over time during the operation of the system 1 and based on a desired irrigation recipe.

Thus, the regulation device 7 allows the respective sprinkler 10 to distribute an amount of liquid F over the ground G as strictly required based on optimal demands.

In addition, the use of the BLDC motor 33 and the local electronic control unit 13 afford smooth and gradual regulation of the flow rate of the liquid F to avoid sudden flow variations in the system 1 and consequent water hammers in each single drop pipe 6

Advantageously, the regulation device 7 comprises an antenna 45, preferably of the NFC type, for bidirectional communication with the memory unit associated with the local electronic control unit 13.

Thus, using the antenna 45 a user may configure each regulation device 7 of the system 1 by storing in the respective memory unit the values required for operation of the system 1, such as the installation point of the respective regulation device 7 along the supply line 5, the diameter D of the respective nozzle 10 and other parameters of the irrigation recipe.

In addition, if a regulation device is defective or damaged or needs to be replaced by another device, the user may download data from the defective device to save it in the memory of the new replacement device.

Preferably, the memory unit, the antenna 45, the electronic control unit 13 and the sensor means are installed on a single electronic board 46.

A further aspect of the invention provides a method for regulating the flow rate of an irrigation liquid F in an irrigation plant.

The method of the invention has a first step of a) providing at least one pipeline 5 for feeding an irrigation liquid F, a step of b) providing at least one drop pipe 6 connected to the pipeline 5 and a step of c) providing a regulation device 7 as described above and associated with each drop pipe 6.

The method further comprises a step of d) providing a control unit 13 with an operating program installed thereon, configured to move the valve member 15 of the regulation device 7, and a step of e) moving the valve member 15 to vary the flow rate downstream of each drop pipe 6 based on the required pressure values $P_{REQ}$ corresponding to the diameter D of each nozzle 10 and based on the irrigation recipe loaded in a central control unit of the system.

Before the step e) of moving, an initial calibration step e') is provided to initially move the valve member 15 to a fully open position, and therefore to measure the supply current required to move the valve member 15 toward the closed position.

After the initial calibration phase e') the speed and pressure controls of the regulator are active. The step e') is automatically activated each time the regulation device 7 is switched on to account for the actual environmental and operating conditions.

So, the flow rate downstream of each drop pipe 6 is continuously and gradually varied without sudden variations and water hammers and the electronic control unit 13 is associated with sensor means configured to detect abnormal operation and malfunctioning of the regulation device 7 and to carry out preventive maintenance on the system.

For example, if the valve member 15 of a given pressure regulator 7 continues to move to open or close and its respective pressure sensor 44 does not detect the required pressure value $P_{REQ}$ within a given time, the electronic control unit 13 may report a fault to the central control unit of the system 1.

Possibly, the electronic control unit 13 may carry out a total opening and/or closing cycle on the pipe section 14 to clear it of any dirt and then attempt a new regulation to reach the required pressure value $P_{REQ}$ that has been set or simply to report a malfunction and keep the valve member 15 in the fully open or closed position.

It will be appreciated from the foregoing that the system and the method for the intelligent regulation of the flow rate of a liquid in an irrigation plant according to the invention fulfill the intended objects and namely allow indication of any abnormal operation and malfunctioning of each regulation device for preventive maintenance.

The system and method of the invention are susceptible to a number of changes or variants, within the inventive concept disclosed in the annexed claims.

While the system and method have been described with particular reference to the accompanying figures, the numerals referred to in the disclosure and claims are only used for the sake of a better intelligibility of the invention and shall not be intended to limit the claimed scope in any manner.

Reference herein to "one embodiment" or "the embodiment" or "some embodiments" indicates that a particular characteristic, structure or element that is being described is included in at least one embodiment of the inventive subject matter.

Furthermore, the particular characteristics, structures or elements may be combined together in any suitable manner to provide one or more embodiments.

INDUSTRIAL APPLICABILITY

The present invention may find application in industry, because it can be implemented on an industrial scale in the field of irrigation systems.

The invention claimed is:

1. A system (1) for regulating a flow rate of a liquid (F) in an irrigation plant, comprising:
    at least one pipeline (5) for feeding the liquid (F);
    at least one drop pipe (6) connected to said at least one pipeline (5);
    at least one regulation device (7) connected to a respective drop pipe (6) and associated with a distribution device (8) having a nozzle (10);
    wherein each regulation device (7) comprises a continuous regulating valve (12) and a local electronic control unit (13) for varying pressure and flow rate of the liquid that is sent to said nozzle (10);
    wherein said continuous regulating valve (12) comprises a pipe section (14) made of an elastically yielding material connected to said drop pipe (6) and a valve member (15) adapted to transversely interact with said pipe section (14) to deform said pipe section and vary a flow area (S) thereof; and
    wherein a program is installed in said local electronic control unit (13), configured to control a movement of said valve member (15) and to vary the flow rate downstream of each drop pipe (6); and
    a sensor associated with said local electronic control unit (13) to detect abnormal operation and malfunctioning of said at least one regulation device (7) and to perform preventive maintenance,
    wherein said valve member (15) is operatively coupled to an electric motor (33),
    wherein said sensor comprises an encoder associated with said electric motor (33) for controlling a direction of rotation thereof and an electrical measuring system configured to detect a current absorption required by said electric motor (33) to move said valve member (15),
    wherein said electric motor (33) is operably coupled to said valve member (15) to move said valve member between a fully open position, in which the flow area (S) of said pipe section (14) does not change, and a fully closed position, in which said electric motor presses said pipe section (14) and blocks a flow of the liquid (F),
    wherein said program comprises an initial calibration routine automatically actuated each time said regulation device (7) is switched on to initially move said valve member (15) into said fully open position and then to measure a supply current of said electric motor (33) for a stroke of said valve member (15) toward the closed position,
    wherein said local electronic control unit (13) is associated with a memory unit configured to store required pressure values ($P_{REQ}$) corresponding to a diameter (D) of the nozzle (10), said regulation device (7) comprising an antenna (45) for bidirectional communication with said memory unit associated with said electronic control unit (13), and
    wherein said memory unit, said antenna (45), said electronic control unit (13) and said sensor are installed on a single electronic board (46).

2. The system as claimed in claim 1, wherein said sensor comprises a position sensor (37) associated with said valve member (15) to detect said fully open position, said position sensor (37) being configured to actuate said electrical measuring system as said valve member (15) moves.

3. The system as claimed in claim 2, wherein said valve member (15) is operably associated with a kinematic mechanism (38) for interacting with said position sensor (37) in an initial part of the stroke of said valve member (15).

4. The system as claimed in claim 1, wherein the stroke of said valve member (15) toward the closed position is determined by a predetermined rotation of said encoder.

5. The system as claimed in claim 1, wherein said sensor comprises a pressure sensor (44) operably associated with said electronic control unit (13) and configured to detect an instantaneous pressure ($P_{IST}$) of the liquid (F) upstream of said nozzle (10).

6. The system as claimed in claim 1, wherein said electronic control unit (13) and said sensor are configured to keep a speed of movement of said valve member (15) substantially constant excepting in a start and stop transients.

7. The system as claimed in claim 1, wherein said continuous regulating valve (12) is housed in a box-shaped body (16) with a main shell (17) having a longitudinal seat (23) for accurately housing and supporting said pipe section (14).

8. The system as claimed in claim 7, wherein said valve member (15) comprises a head (30) configured to interact with said pipe section (14), said head (30) having a trapezoidal longitudinal profile with a central region (32) connected to two inclined sections (31) and further having a shape complementary to said longitudinal seat (23) to avoid any sudden area variation and any projection inside said pipe section (14) which would lead to trapping of impurities and foreign bodies contained in the liquid (F).

9. The system as claimed in claim 8, wherein said box-shaped body (16) comprises a secondary shell (18) facing said main shell (17) and having a hollow member (26) with a transverse seat (27) defined therein, opposite to said longitudinal seat (23) of said main shell (17) to slidingly guide said valve member (15).

10. A method of regulating a flow rate of an irrigation liquid (F) in an irrigation plant, comprising:
   a) providing at least one pipeline (5) for feeding the irrigation liquid (F);
   b) providing at least one drop pipe (6) connected to said pipeline (5);
   c) providing a regulation device (7) having a pipe section (14) made of an elastically yielding material connected to said at least one drop pipe (6) and a valve member (15) adapted to transversely interact with said pipe section (14) to deform said pipe section and vary a flow area (S) thereof;
   d) providing a local electronic control unit (13), in which a program for controlling a movement of said valve member (15) is installed, said local electronic control unit (13) being associated with a memory unit configured to store required pressure values ($P_{REQ}$) corresponding to a diameter (D) of a nozzle (10), said regulation device (7) comprising an antenna (45) for bidirectional communication with said memory unit associated with said electronic control unit (13); and
   e) moving said valve member (15) to vary the flow rate downstream of each drop pipe (6) based on the required pressure values ($P_{REQ}$) corresponding to the diameter (D) of the nozzle (10) and based on an irrigation recipe loaded in a central control unit of the irrigation plant;
wherein the flow rate downstream of each drop pipe (6) is continuously and gradually varied, and wherein said electronic control unit (13) is associated with a sensor,
wherein, upstream of said step e) of moving, an initial calibration step e') is provided to move said valve member (15) to a fully open position and actuate said sensor to measure a supply current required to move said valve member (15) toward a closed position, said step e') being automatically actuated each time said regulation device (7) is switched on,
wherein, if abnormal operation or malfunctioning of said regulation device (7) is detected, said electronic control unit (13) is configured to move said valve member (15) and carry out a total opening or closing cycle on said pipe section (14) and then reach a required pressure value ($P_{REQ}$), and
wherein said memory unit, said antenna (45), said electronic control unit (13), and said sensor are installed on a single electronic board (46).

* * * * *